United States Patent [19]

Oono

[11] Patent Number: 4,874,064
[45] Date of Patent: Oct. 17, 1989

[54] BRAKE APPARATUS FOR AUTOMOTIVE VEHICLE

[75] Inventor: Toshio Oono, Okazaki, Japan

[73] Assignee: Aisin Takaoka Limited, Toyota, Japan

[21] Appl. No.: 63,240

[22] Filed: Jun. 17, 1987

[30] Foreign Application Priority Data

Jun. 25, 1986 [JP] Japan .................................. 61-148893

[51] Int. Cl.[4] ............................................ F16D 55/02
[52] U.S. Cl. .................................. 188/70 R; 188/73.2;
188/366; 192/70.15
[58] Field of Search .................... 188/71.7, 70 R, 366,
188/367, 73.31, 73.2; 192/70.15

[56] References Cited

U.S. PATENT DOCUMENTS

| | | |
|---|---|---|
| 1,125,595 | 1/1915 | Reeder et al. ...................... 192/70.15 |
| 2,003,198 | 5/1935 | Jenkins ................................. 188/73.2 |
| 2,102,406 | 12/1937 | Cohen ............................... 188/366 V |
| 2,273,345 | 2/1942 | Burrell ................................. 188/366 |
| 3,982,610 | 9/1976 | Campagnolo ...................... 188/73.2 |
| 4,262,784 | 4/1981 | Collins ............................... 192/70.15 |

FOREIGN PATENT DOCUMENTS

| | | | |
|---|---|---|---|
| 1470500 | 2/1967 | France ............................... 188/70 R |
| 61-6037 | 1/1986 | Japan . | |
| 61-36521 | 2/1986 | Japan . | |
| 61-55415 | 3/1986 | Japan . | |
| 61-54971 | 11/1986 | Japan . | |
| 1161133 | 8/1969 | United Kingdom ............. 188/70 R |

Primary Examiner—Andres Kashnikow
Assistant Examiner—Matthew C. Graham
Attorney, Agent, or Firm—Burns, Doane, Swecker & Mathis

[57] ABSTRACT

A brake apparatus for an automotive vehicle having a wheel hub and a steering knuckle, wherein an annular V groove is formed on one side of a rotary disk of the wheel hub; a V-shaped brake member is mounted on the steering knuckle so as to be removably engageable with the V groove of the wheel hub; and at least one radial bearing and thrust bearing are disposed between a hub body of the wheel hub and an inner circumference of the steering knuckle. The apparatus is smaller in volume and simple in structure without need of a conventional caliper and a pair of pistons and further without producing biased wear on the friction surface thereof.

12 Claims, 4 Drawing Sheets

BRAKE APPARATUS FOR AUTOMOTIVE VEHICLE

BACKGROUND OF THE INVENTION

The present invention relates to a brake apparatus for an automotive vehicle, and more specifically to a brake apparatus for industrial vehicles, in which brake operation is effected on the basis of engagement an annular V-shaped groove of a wheel hub and a V-shaped brake member of a steering knuckle.

As an example of conventional brake apparatus for automotive vehicles, Japanese Utility Model Kokoku Publication No. 50-30533 (examined) discloses a disk brake apparatus. In this apparatus, as shown in FIG. 1, a spindle 21 is fixed to a steering knuckle (not shown) is disposed passing through a wheel hub 22, and the wheel hub 22 is rotatably supported by a pair of tapered roller bearings 23 and 23 disposed between the spindle 21 and the wheel hub 22. A disk rotor 25 and a disk wheel (not shown) are mounted on the wheel hub 22 by bolts 24, and further a caliper 26 is attached to the steering knuckle (not shown).

In this conventional disk brake apparatus, although braking force can be obtained by sandwiching the disk rotor 25 with a pair of pads 27 and 27 retained on the caliper 26, since a pair of tapered roller bearings 23 are used for supporting the spindle 21 as described above, no special consideration is taken about an axial force applied to the spindle 21. This is because in the case with the disk brake, no heavy load is produced in the axial direction of the bearings in brake operation. Further, in case where this brake apparatus is mounted on the rear wheel of an FR vehicle, it has been unnecessary to take a special consideration to the axial load produced during vehicle running.

Recently, there have been noted of an increasing number of the FF vehicles. However, in the FF vehicles, a great axial force is exerted to the brake apparatus mounted on the front wheels during steering of the vehicle. Therefore, when a great axial force is exerted to the conventional brake apparatus, as already explained, there exists a problem in that the bearings 23 may become loose or dismounted and thus it is impossible to mount the conventional brake apparatus on the front wheels of an FF vehicle to which a great axial force is exerted.

In addition, in the front wheels of an FF vehicle, since the brake apparatus should be mounted together with a front wheel driving mechanism and a steering mechanism, it is also necessary to minimize and simplify the brake apparatus structure. In other words, there has existed a strong demand of developing a small-sized and simplified brake apparatus for an automotive vehicle, which can withstand a heavy axial load in both braking and steering operations.

Further, in the case of the conventional brake apparatus disclosed in Japanese Patent Kokai Publication No. 61-55415, a V-shaped groove (referred to as "V groove") formed into an equilateral triangular shape in cross section is provided on one side surface of a rotary disk, and two annular sliding surfaces are provided on the inner and outer circumferential sides so that friction members can slidably fit to the sliding surfaces. In a brake apparatus having two or more friction surfaces, in general, when an axial load is applied thereto, a biased wear (unbalanced wear) is easily produced on the brake friction surfaces. Therefore, it is also desired to prevent this biased wear.

SUMMARY OF THE INVENTION

A primary object of the present invention is to provide a brake apparatus for an automotive vehicle which can satisfy the afore-mentioned requirements, that is, which has a sufficient strength against an axial load while minimizing and simplifying the apparatus.

In particular, another object of the present invention is to provide a brake apparatus for an automotive vehicle, which can be mounted on the front wheels of an FF vehicle.

A further object of the present invention is to provide a brake apparatus which can prevent occurrence of biased wear produced on the friction surfaces when an axial force is applied.

Further objects of the present invention will become apparent in the entire disclosure of this specification.

The above-mentioned object or objects can be achieved by the following structure. That is, according to a first aspect of the present invention, an annular V groove is formed on a side of a rotary disk of a wheel hub; a V-shaped braking member is mounted on a steering knuckle so as to be engageable with and disengageable from the V groove of the wheel hub; and radial and thrust bearings are disposed between a body portion of the wheel hub and an inner circumference of the steering knuckel.

In this structure, when the V-shaped brake member is brought into pressure contact with the V groove in braking operation, the pressure of the V-shaped brake member is transmitted to the rotary disk of the wheel hub, so that a great braking force is generated on the friction surfaces between the V-shaped brake member and the V groove. Further, when the V-shaped brake member is pushed against the V groove, although a reactive force in the opposite direction will be produced as a reaction of the pressure of the V-shaped brake member and therefore the bearings are subjected to an axial force, this axial force is received by the thrust bearing disposed between the wheel hub and the steering knuckle. Therefore, where the brake apparatus is mounted on the front wheels of an FF vehicle, the thrust bearings can receive a great axial force generated in steering operation.

Further, when the V-shaped brake member is released from the V groove in pressure, the brake member is retained at a predetermined position without being subjected to a reactive force of the bearings.

Each bearing can be supported by a bearing holder fitted to a hub body of the wheel hub, and this bearing holder is sandwiched between a cylindrical member wih a flange and a projection formed on the inner circumference of the steering knuckle, thus the bearings being firmly supported.

Further, in the brake apparatus, it is unnecessary to provide a piston on both the sides of the brake disk, being different from the conventional apparatus, therefore no caliper is needed, thus enabling the miniaturization and simplification of the apparatus.

According to the second aspect of the present invention, the cross section of the V groove which forms sliding surfaces is inequilateral triangular in shape in the radial direction and therefore one side (width) on the outer circumference is wider than the other side (width) on the inner circumference.

Although a circumferential friction force generated on the outer circumferential friction surface of the V-shaped brake member is smaller than that generated on the inner circumferential friction surface thereof, since the cross sections of the wheel hub V groove and the V-shaped brake member are inequilateral triangular in shape and therefore one side on the outer circumference is longer than that of the inner circumference in each cross section, brake torque generated on the outer circumferential friction surface of the V-shaped brake member due to friction is substantially the same as that generated on the inner circumferential friction surface, so that wear of the V-shaped brake member proceeds uniformly, thus preventing biased contact of the V-shaped brake member against the V groove sliding surface of the rotary disk; that is, eliminating biased wear.

DETAILED DESCRIPTION OF THE PREFERRED EMBODIMENTS

An embodiment of the present invention will be described with reference to the attached drawings.

Figure 1:
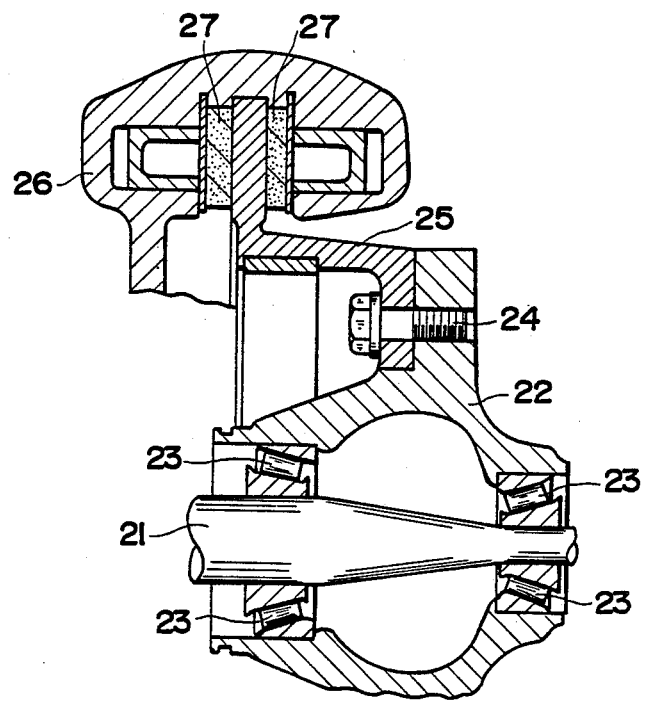
FIG. 1 is a cross-sectional view showing a conventional braking apparatus.
Figure 2:
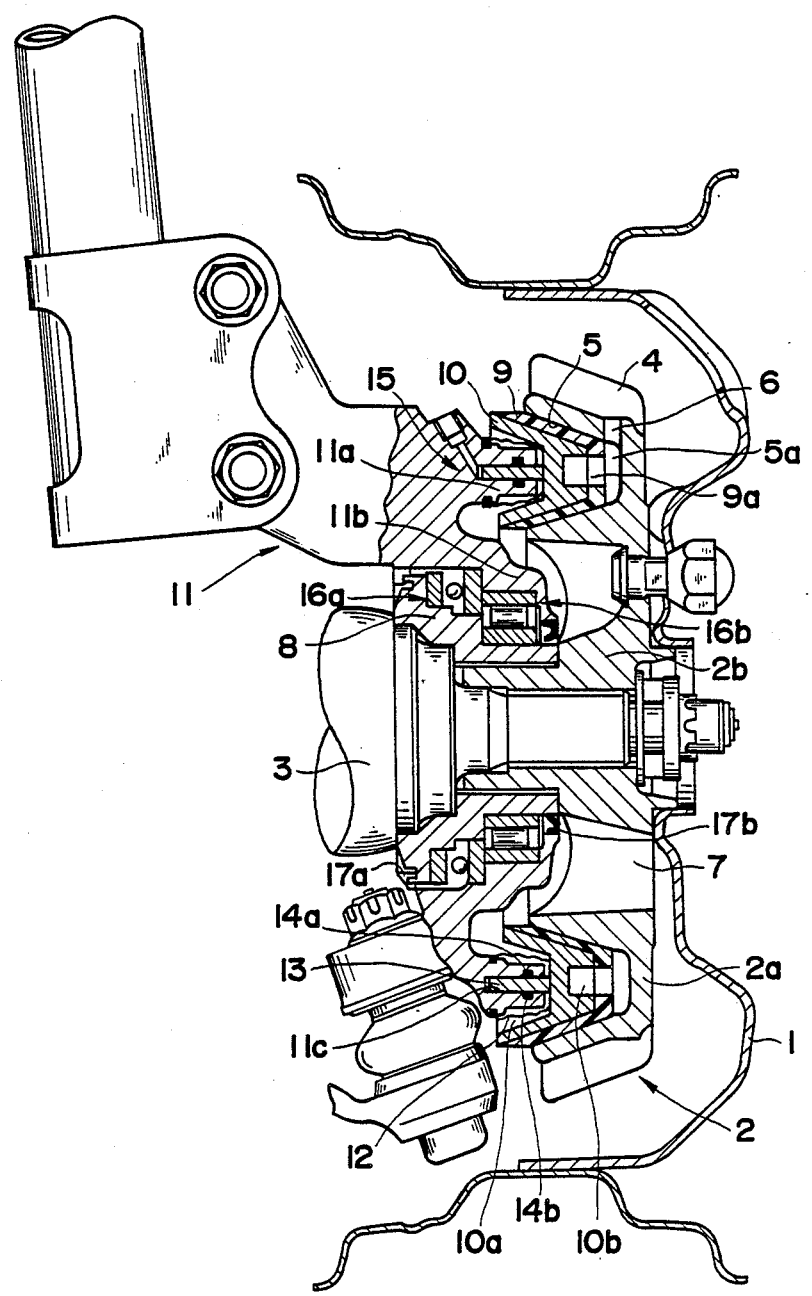
FIG. 2 is a cross-sectional view showing a brake apparatus according to an embodiment of the present invention.

In FIG. 2, the reference numeral 1 denotes a wheel disk; 2 denotes a wheel hub; 3 denotes a shaft. These elements are all connected integral with each other with bolts and nuts (not shown). The wheel hub 2 is composed of an outer circumferential rotary disk 2a and an inner circumferential hub body 2b. A plurality of cooling fins 4 are formed on the outer circumferential surface of the rotary disk 2a, and a V groove 5 is formed on one side surface thereof in annular fashion. An annular bottom groove 5a is formed at the bottom of the V groove 5, and further a plurality of through-holes 6 are formed substantially radially extending from the annular bottom groove 5a to the outer circumferential surface of the rotary disk 2a. A plurality of ventilation holes 7 substantially axially extending through a rotary disk 2a are provided at predetermined positions adjacent to the hub body 2b of the rotary disk 2a, and a cylindrical member (bearing support) 8 having a flange on an axis side is connected integral with the hub body 2b. An annular V-shaped brake member 9 made of an organic friction material and formed with an annular groove 9a on the top thereof is fixed to an annular member 10 fixed to the outer circumference of the steering knuckle 11, and is fitted into the V groove 5. When pushed against the V groove 5 by the annular member 10, this V-shaped brake member 9 is brought into pressure contact with the V groove 5. However, when not pushed thereto, the two members 9 and 5 are released from pressure contact with each other. The annular member 10 is formed with an annular groove 10a or 10b on each end surface thereof and supported by a torque support member (not shown). The bottom of the V groove 5, the annular groove 9a on the top of the V-shaped brake member 9, and the annular groove 10b of the annular member 10 communicate with one another and form an annular gap. The steering knuckle 11 is provided with an annular outer circumferential projection 11a and an annular inner circumferential projection 11b. The outer circumferential projection 11a is coaxially fitted to the annular groove 10a of the annular member 10 and also disposed concentrically with respect to the V groove 5.

Figure 3:
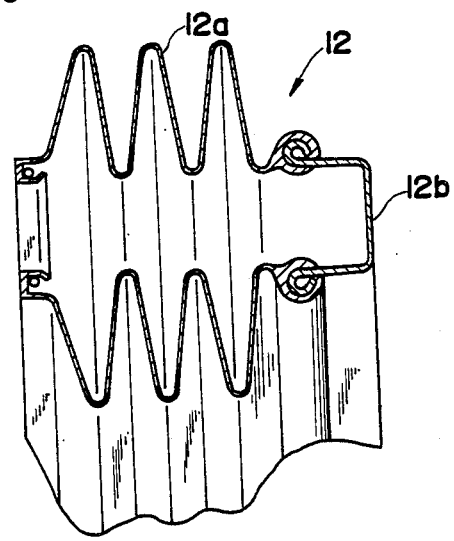
FIG. 3 is a cross-sectional view showing an essential portion of a boot incorporated in the brake apparatus shown in FIG. 2.

Further, the projection 11a is covered with a boot 12 composed of a rubber bellows 12a and a stainless crown 12b both shown in FIG. 3. Further, the projection 11a is formed with an annular groove 11c for housing an annular piston 13. This annular piston 13 is disposed within this annular groove 11c coaxially therewith so as to face the annular member 10, and the piston 13 is formed with a curved end surface so as to fit to the annular member 10. Annular seal members 14a and 14b are fitted to between the piston 13 and the outer circumferential projection 11a, respectively. Therefore, the wheel cylinder 15 is made up of the piston 13, the annular groove 11c and the annular seal members 14a and 14b. A thrust bearing 16a and a radial bearing 16b are supported by the inner circumferential projection 11b of the steering knuckle 11 and the flange of the cylindrical member 8. One side surface of the cylindrical member 8 is in contact with the shaft 3. Further, annular oil seal members 17a and 17b are fitted to between the steering knuckle 11 and the cylindrical member 8 at the opening portion of the inner circumferential projection 11b within the steering knuckle 11.

In brake operation, when hydraulic pressure of a master cylinder (not shown) is applied to the oil cylinder 15; the piston 13 is pushed under pressure, the V-shaped brake member 9 is urged against the V groove 5 via the boot 12 and the annular member 10, so that the V-shaped brake member 9 and the V groove 5 are coaxially friction-fitted to each other. In this case, a great braking force is generated on the friction surfaces between the V-shaped brake member 9 and the V groove 5 in dependence upon of the wedge principle. Friction heat generated by friction fitting between the V-shaped brake member 9 and the rotary disk 2a is conducted to the cooling fins 4 and the ventilation holes 7, and then radiated from the surfaces of the cooling fins 4 and the ventilation holes 7 by air flow caused when the wheel hub 2 rotates, to reduce temperature at the rotary disk 2a. Further, although wear powder is produced due to friction fitting between the V-shaped brake member 9 and the V groove 5, the produced wear powder moves to the annular bottom groove 5a passing through the V-shaped gap between the V groove 5 of the rotary disk 2a and the V-shaped brake member 9 by centrifugal force caused when the rotary disk 2a rotates, once being accumulated within the annular bottom groove 5a, and then removed toward the outside through the through-hole(s) 6.

When hydraulic pressure of the wheel cylinder 15 is released, the friction generated between the V-shaped brake member 9 and the V groove 5 is released to bring the V-shaped brake member 9 away from the V groove 5. Further, the piston 13 is retracted on the basis of a retraction force of the annular seal members 14a and 14b, so that the V-shaped brake member 9 is moved away from the rotary disk 2a. At this moment, external air flows into the throughhole(s) 6 by a forcive flow caused when the rotary disk 2a rotates to cool the outer circumference of the rotary disk 2a.

When the V-shaped brake member 9 is brought into pressure contact with the V groove 5, the bearing 16a and 16b are subjected to an axial reverse-direction force from the shaft 3 as a reative force of the pressure of the V-shaped brake member 9. However, these bearings 16a and 16b are held at a predetermined position by the flange of the cylindrical member 8 and the inner circumferential projection 11b of the steering knuckle 11, because the axial force can be received by the thrust bearing 16a.

Further, when the V-shaped brake member 9 is released from the V groove 5, these bearings 16a and 16b are held at the predetermined position without being subjected to the axial reverse-direction force due to reaction. Further, the cylindrical member 8 with the flange is supported by the bearings 16a and 16b, and the shaft 3 is supported by the cylindrical member 8, so that the cylindrical member 8, the shaft 3 and the wheel hub 2 rotate all together integrally.

In the above-mentioned brake apparatus for an automotive vehicle according to the present invention, the annular V groove is formed in the rotary disk of the wheel hub; the annular piston is provided on the outer circumference of the steering knuckle; and the annular member formed with the annular V-shaped brake member is disposed therebetwee. Therefore, no caliper is needed, thus minimizing and simplifying the brake apparatus. In addition, since braking force can be generated on the side surface of the rotary disk in the same way as in the disk brake, brake feeling is excellent. Furthermore, the annular member shifts forward when wear of either one or both of the V-shaped brake member and the V groove proceeds so that gap adjustment is made automatically or additional gap adjustment is unnecessary even after wear occured on the friction surface.

The sliding surface area between the rotary disk and the V-shaped brake member can be determined greater than that defined between the rotor and the pads of the conventional disk brake, so that the braking force is great and therefore the degree of wear can be reduced because load applied to unit area can be reduced by the greater sliding surface area. Since the annular bottom groove is formed in the V-groove bottom of the rotary disk and further a plurality of throughholes extending from the annular bottom groove to the outer circumferential surface of the rotary disk are provided, outside air can flow into the throughholes to increase the cooling effect. In addition, in the case where water comes into the V-shaped gap between the V groove of the rotary disk and the V-shaped brake member, the water can be moved toward the annular bottom groove from the V-shaped gap by a centrifugal force of the rotary disk, accumulated once in the annular bottom groove, and then drained outwards through the throughholes, thus excellent braking force being obtainable without reducing braking function.

Since the wear powder produced due to frictional engagement operation between the rotary disk and the V-shaped brake member can be readily removed outwards through the throughholes via the annular bottom groove formed at the bottom of the V groove, and sliding motion between the rotary disk and the V-shaped brake member is smooth in brake operation, without generating brake vibration. Further, although gas may be produced from the V-shaped brake member made of organic friction material during the brake operation, since the gas can be quickly exhausted outwards by way of the V-shaped gap, the annular bottom groove and the throughholes, it is possible to obtain a stable braking force at all times without reducing braking function.

Figure 4:
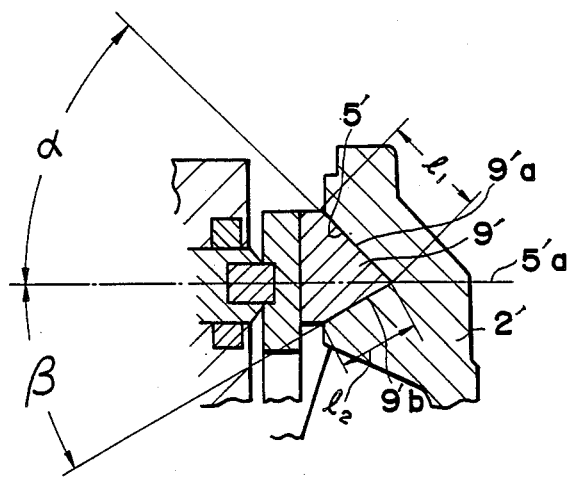
FIG. 4 is a cross-sectional view showing another embodiment of a V-shaped brake member.

FIG. 4 shows another embodiment of the V-shaped brake member of the brake apparatus according to the present invention. In FIG. 4, the cross section along the axis of the V groove 5' is formed in inequilateral triangular shape; that is, one side $l_1$ of the outer circumference is longer than that $l_2$ of the inner circumference. The apex angle $(\alpha + \beta)$ of the V-shaped brake member is determined in such a way that $\alpha$ is greater than $\beta$ and the braking torque produced on the outer circumferential surface 9'a is substantially equal to that on the inner circumferential surface 9'b. Here, $\alpha$ denotes an angle subtended by a straight line 5'a (passing through the bottom point of the V groove and in parallel to the rotational axis of the disk) and the side 9'a; and $\beta$ denotes an angle subtended by the same straight line 5'a and the side 9'b, both in cross section shown in FIG. 4.

In the brake apparatus shown in FIG. 2, when the axial cross section of the V groove is formed in equilateral triangular shape, although frictional force generated on the outer circumferential friction surface of the V shaped brake member is almost equal to that on the inner circumferential friction surface thereof in the circumferential direction, since the sliding distance on the outer frictional surface is longer than that on the inner frictional surface, friction heat will be generated more on the outer circumferential frictional surface than on the inner frictional surface, thus resulting in a problem such that wear of the outer friction surface proceeds more speedily.

However, where the shape of the V-shaped brake member is formed as shown in FIG. 4, although the circumferential friction force per unit area produced on the outer circumferential surface 9'a of the V-shaped brake member is smaller than that produced on the inner circumferential surface 9'b, since the total braking torque produced on the outer circumferential friction surface of the V-shaped brake member due to friction is substantially the same as that produced on the inner circumferential friction thereof, wear of the V-shaped brake member 9' can proceed uniformly.

As to the angles $\alpha$ and $\beta$ corresponding to the side lengths $l_1$ and $l_2$, the angle $\alpha$ may be selected within a range 3 to 5 times of $\beta$. The side lengths $l_2$ and $l_2$ may be determined in relation with these angles.

Figure 5:
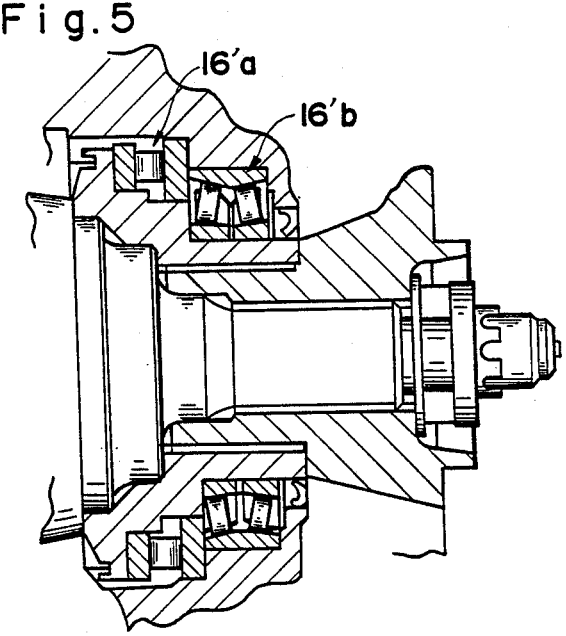
FIG. 5 is a cross-sectional view showing another embodiment of a braking incorporated in the brake apparatus.

FIG. 5 shows another exemplary combination of the thrust and radial bearings, in which a taper roller bearing 16'a is used as the thrust bearings, and a double row composite bearing 16'b is used as the radial bearing.

Figure 6:
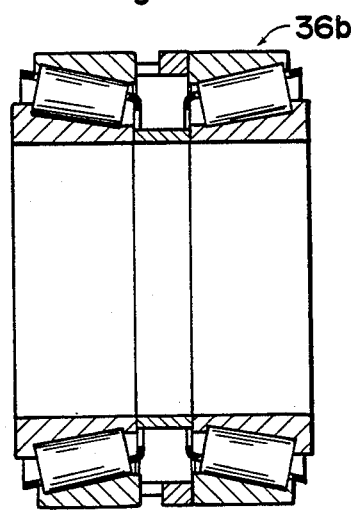
FIGS. 6 7 and 8 are cross-sectional views showing other bearings available for the brake apparatus of the present invention.
Figure 7:
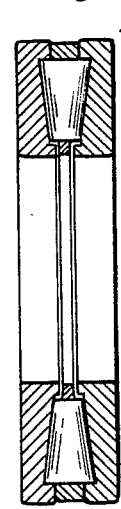
Figure 8:
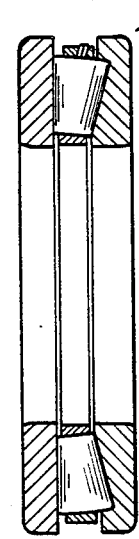

Further, FIG. 6 shows the case where a SR-type double row composite bearing 36b is used as the radial bearing. In FIG. 7, a TTHD type thrust bearing 36a is shown as an example of the thrust bearing; and in FIG. 8, a TTHDFL type thrust bearing 36a' is shown in the same way.

It should be understood that modifications may be done without departing from the gist herein disclosed and scope as hereinbelow claimed.

What is claimed is:

1. A brake apparatus for an automotive vehicle comprising:
   a wheel hub mounted for rotation about an axis of rotation and having inner and outer axial ends, said wheel hub including a rotary disk and a hub body, said rotary disk being provided with an annular V groove in a side thereof facing the inner axial end, said groove being concentric with said axis of rotation;
   a separate and discrete bearing support member abutting said hub body and having an outer circumferential surface and a flange portion extending radially outwardly of said hub body at said inner axial end of said wheel hub;
   a steering knuckle mounted adjacent said inner axial end of said wheel hub and being provided with an annular portion which is concentric with said axis of rotation and which extends axially of and radially outwardly of said bearing support member, said annular portion having an inner circumferential surface and including a projection extending radially inwardly of said annular portion at an axial position intermediate said inner and outer axial ends of said wheel hub;
   a V-shaped brake member mounted on said steering knuckle and being engageable and disengageable with said V-groove through movement in a direction parallel with said axis of rotation of the wheel hub; and
   bearing means for radially and axially supporting the wheel hub relative to said steering knuckle, said bearing means being disposed between said outer circumferential surface of said bearing support member and the inner circumferential surface of the annular portion of the steering knuckle, and being axially secured between said projection and said flange portion.

2. The brake apparatus for an automotive vehicle as set forth in claim 1, wherein said bearing means comprises at least one radial bearing and at least one thrust bearing both disposed between the outer circumferential surface of the bearing support member and the inner circumferential surface of the annular portion of the steering knuckle, and wherein both bearings are axially secured between the projection of the annular portion and the flange portion of the bearing support member.

3. The brake apparatus for an automotive vehicle as set forth in claim 2, wherein outer rings of said radial bearing and said thrust bearing are in contact with each other.

4. The brake apparatus for an automotive vehicle as set forth in claim 1, wherein a piston is provided on the outer circumferential side of the steering knuckle so that said V-shaped brake member is engaged with and disengaged from said V groove of the wheel hub.

5. The brake apparatus for an automotive vehicle as set forth in claim 4, wherein a boot is disposed between the outer circumferential side of the steering knuckle and said V-shaped brake member so as to cover said piston.

6. The brake apparatus for an automotive vehicle as set forth in claim 1, wherein said V groove of the wheel hub and said V-shaped brake member are formed into an inequilateral triangular shape in cross section so that one side of the outer circumference thereof is formed longer than that of the inner circumference thereof.

7. A brake apparatus for an automotive vehicle comprising:
   a wheel hub mounted for rotation about an axis of rotation and having inner and outer axial ends, said wheel hub including a rotary disk and a hub body, said rotary disk being provided with an annular V groove in a side thereof facing the inner axial end, said groove being concentric with said axis of rotation, said hub body including a bearing support member having an outer circumferential surface and a flange portion extending radially outwardly of said hub body at said inner axial end of said wheel hub;
   an axle extending through said hub body;
   a steering knuckle mounted adjacent said inner axial end of said wheel hub and being provided with an annular portion which is concentric with said axis of rotation and which extends axially of and radially outwardly of said bearing support member, said annular portion having an inner circumferential surface and including a projection extending radially inwardly of said annular portion at an axial position intermediate said inner and outer axial ends of said wheel hub;
   a V-shaped brake member mounted on said steering knuckle and being engageable and disengageable with said V-groove through movement in a direction parallel with said axis of rotation of the wheel hub; and
   bearing means for radially and axially supporting the wheel hub relative to said steering knuckle, said bearing means being disposed between said outer circumferential surface of said bearing support member and the inner circumferential surface of the annular portion of the steering knuckle, and being axially secured between said projection and said flange portion.

8. The brake apparatus for an automotive vehicle as set forth in claim 7, wherein said bearing means comprises at least one radial bearing and at least one thrust bearing both disposed between the outer circumferential surface of the bearing support member and the inner circumferential surface of the annular portion of the steering knuckle, and wherein both bearings are axially secured between the projection of the annular portion and the flange portion of the bearing support member.

9. The brake apparatus for an automotive vehicle as set forth in claim 8, wherein outer rings of said radial bearing and said thrust bearing are in contact with each other.

10. The brake apparatus for an automotive vehicle as set forth in claim 7, wherein a piston is provided on the outer circumferential side of the steering knuckle so that said V-shaped brake member is engaged with and disengaged from said V groove of the wheel hub.

11. The brake apparatus for an automotive vehicle as set forth in claim 10, wherein a boot is disposed between the outer circumferential side of the steering knuckle and said V-shaped brake member so as to cover said piston.

12. The brake apparatus for an automotive vehicle as set forth in claim 7, wherein the cross-sectional shape of said V groove of the wheel hub and said V-shaped brake member is an inequilateral triangle so that one side of the outer circumference thereof is formed longer than that of the inner circumference thereof.

* * * * *